US012578793B1

(12) United States Patent
Robillard et al.

(10) Patent No.: US 12,578,793 B1
(45) Date of Patent: Mar. 17, 2026

(54) SYSTEM CONTROL IDENTIFICATION WITH GAZE TRACKING

(71) Applicant: Dell Products L.P., Round Rock, TX (US)

(72) Inventors: Michael Robillard, Shrewsbury, MA (US); Yichun Xu, Everett, MA (US); Xuebin He, Westwood, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/066,006

(22) Filed: Feb. 27, 2025

(51) Int. Cl.
*G06F 3/01* (2006.01)
*G06V 20/52* (2022.01)

(52) U.S. Cl.
CPC .............. *G06F 3/013* (2013.01); *G06F 3/017* (2013.01); *G06V 20/52* (2022.01)

(58) Field of Classification Search
CPC .......... G06F 3/013; G06F 3/017; G06V 20/52
See application file for complete search history.

(56) References Cited

U.S. PATENT DOCUMENTS

| | | | | |
|---|---|---|---|---|
| 10,437,543 B2 * | 10/2019 | Singh | .................... | B60K 35/60 |
| 10,691,391 B2 * | 6/2020 | Singh | .................... | B60K 35/25 |
| 11,449,294 B2 * | 9/2022 | Lee | ........................ | B60K 35/29 |
| 2017/0364148 A1 * | 12/2017 | Kim | ........................ | G06F 3/013 |
| 2018/0032300 A1 * | 2/2018 | Singh | .................... | B60K 35/10 |
| 2019/0377534 A1 * | 12/2019 | Singh | .................... | G06F 3/013 |
| 2020/0241824 A1 * | 7/2020 | Lee | ........................ | G06F 3/165 |
| 2021/0055789 A1 * | 2/2021 | Tsai | ...................... | H04L 67/535 |
| 2022/0128986 A1 * | 4/2022 | Domova | ............ | G05B 23/0272 |

* cited by examiner

*Primary Examiner* — Michael Pervan
(74) *Attorney, Agent, or Firm* — Workman Nydegger

(57) ABSTRACT

A method for enabling user control of a display screen. The example method includes tracking, by a camera, a position of a pupil of an eye of a human user who is positioned to be able to view multiple display screens, determining a location of the pupil within the eye, determining, as among the display screens, and based on the location of the pupil, which of the display screens is being looked at by the user, and enabling control, by the user, of the display screen that the user is looking at.

19 Claims, 11 Drawing Sheets

100

108   CAMERA 1    102       112   CAMERA 2

SCREEN 1            SCREEN 2

104

USER

COMPUTER 1                      COMPUTER 2

106                  114               110

PUPIL TRACKING

PUPIL LOCATION

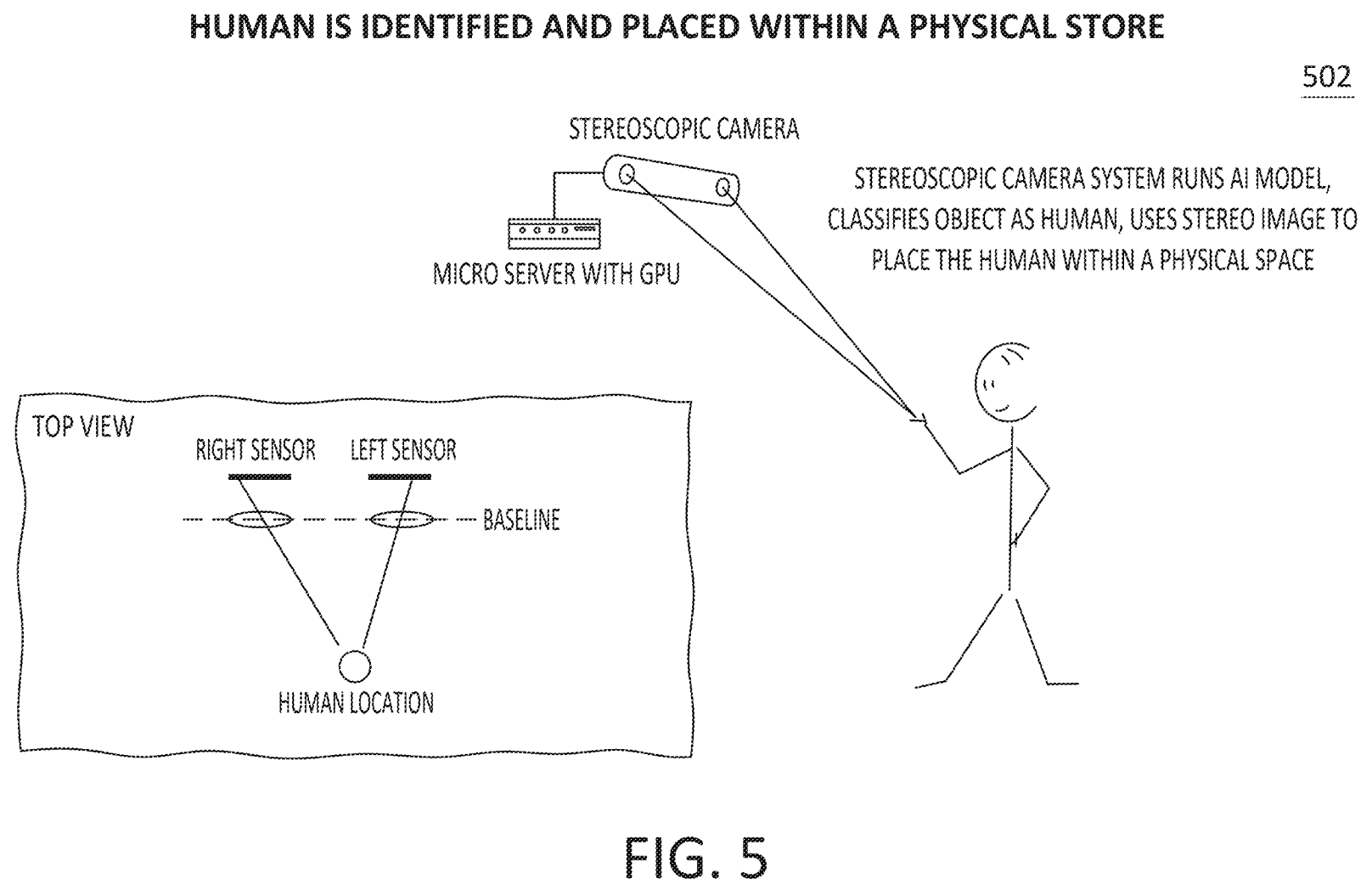

HUMAN IS IDENTIFIED AND PLACED WITHIN A PHYSICAL STORE

502

STEREOSCOPIC CAMERA SYSTEM RUNS AI MODEL, CLASSIFIES OBJECT AS HUMAN, USES STEREO IMAGE TO PLACE THE HUMAN WITHIN A PHYSICAL SPACE

STEREOSCOPIC CAMERA

MICRO SERVER WITH GPU

TOP VIEW

RIGHT SENSOR    LEFT SENSOR

BASELINE

HUMAN LOCATION

FIG. 5

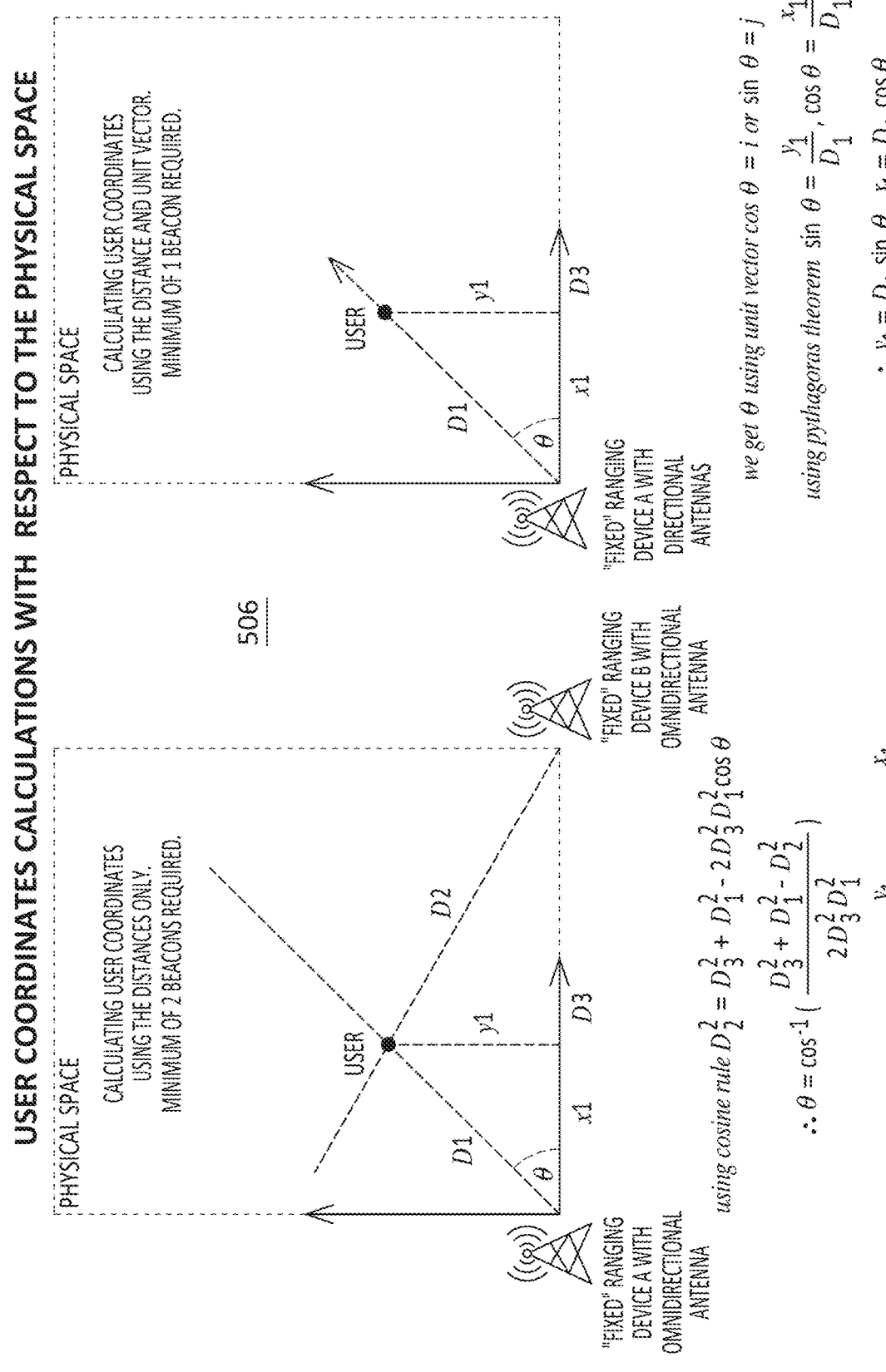

USER COORDINATES CALCULATIONS WITH RESPECT TO THE PHYSICAL SPACE

PHYSICAL SPACE

CALCULATING USER COORDINATES USING THE DISTANCES ONLY. MINIMUM OF 2 BEACONS REQUIRED.

"FIXED" RANGING DEVICE A WITH OMNIDIRECTIONAL ANTENNA

"FIXED" RANGING DEVICE B WITH OMNIDIRECTIONAL ANTENNA $using\ cosine\ rule\ D_2^2 = D_3^2 + D_1^2 - 2D_3^2 D_1^2 \cos\theta$ $\therefore \theta = \cos^{-1}\left(\dfrac{D_3^2 + D_1^2 - D_2^2}{2D_3^2 D_1^2}\right)$ $using\ pythagoras\ theorem\ \sin\theta = \dfrac{y_1}{D_1},\ \cos\theta = \dfrac{x_1}{D_1}$ $\therefore y_1 = D_1 \sin\theta,\ x_1 = D_1 \cos\theta$

PHYSICAL SPACE

CALCULATING USER COORDINATES USING THE DISTANCE AND UNIT VECTOR. MINIMUM OF 1 BEACON REQUIRED.

"FIXED" RANGING DEVICE A WITH DIRECTIONAL ANTENNAS $we\ get\ \theta\ using\ unit\ vector\ \cos\theta = i\ or\ \sin\theta = j$ $using\ pythagoras\ theorem\ \sin\theta = \dfrac{y_1}{D_1},\ \cos\theta = \dfrac{x_1}{D_1}$ $\therefore y_1 = D_1 \sin\theta,\ x_1 = D_1 \cos\theta$

IDENTIFIED CUSTOMER PERFORMING TRANSACTION

512

SIZE CAN BE SELECTED EITHER USING STORED USER PROFILE OR USING GESTURE-BASED INTERFACE

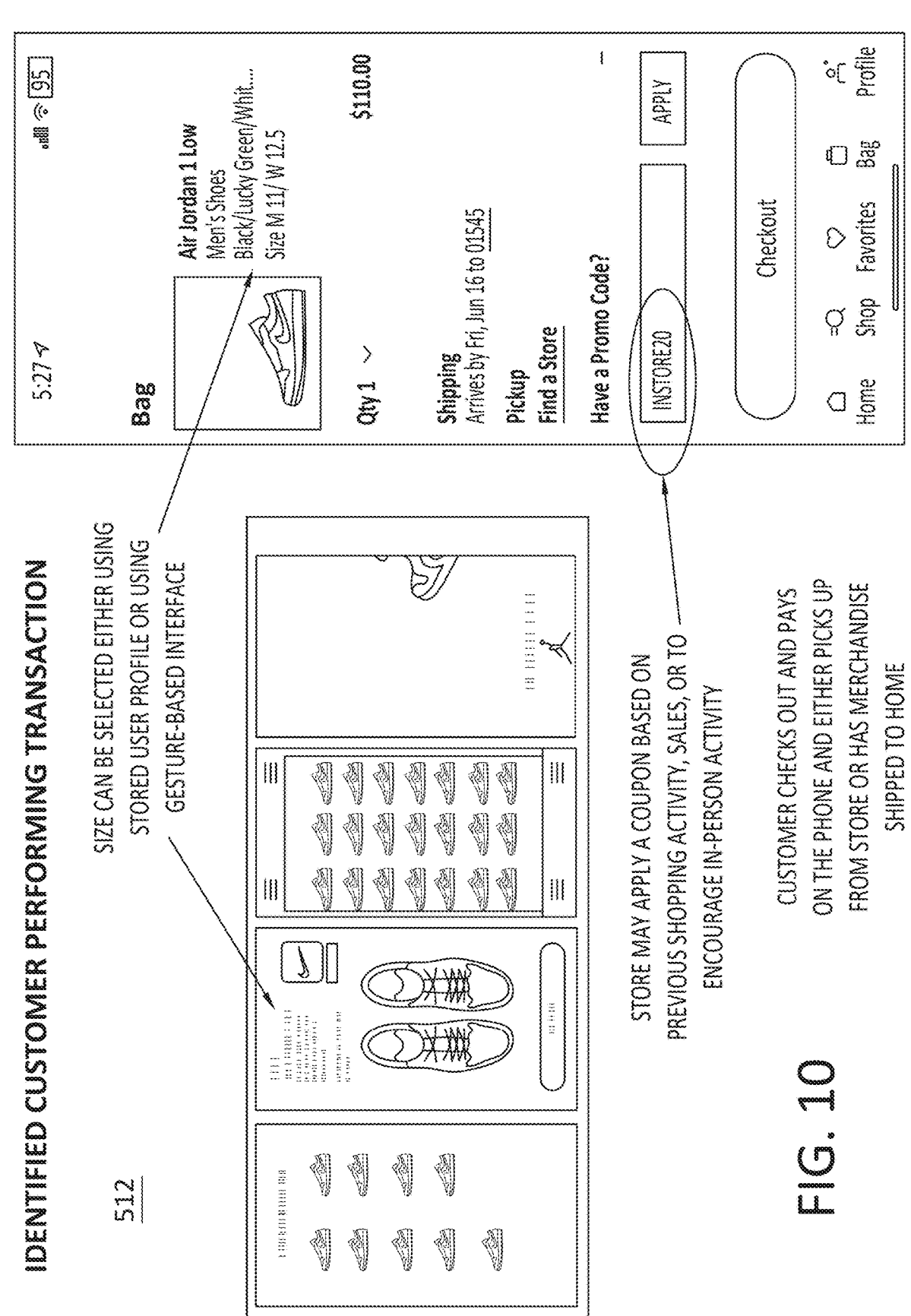

STORE MAY APPLY A COUPON BASED ON PREVIOUS SHOPPING ACTIVITY, SALES, OR TO ENCOURAGE IN-PERSON ACTIVITY

CUSTOMER CHECKS OUT AND PAYS ON THE PHONE AND EITHER PICKS UP FROM STORE OR HAS MERCHANDISE SHIPPED TO HOME

Bag

Air Jordan 1 Low
Men's Shoes
Black/Lucky Green/Whit....
Size M 11/ W 12.5

$110.00

Qty 1

Shipping
Arrives by Fri, Jun 16 to 01545

Pickup
Find a Store

Have a Promo Code?

INSTORE20          APPLY

Checkout

Home  Shop  Favorites  Bag  Profile

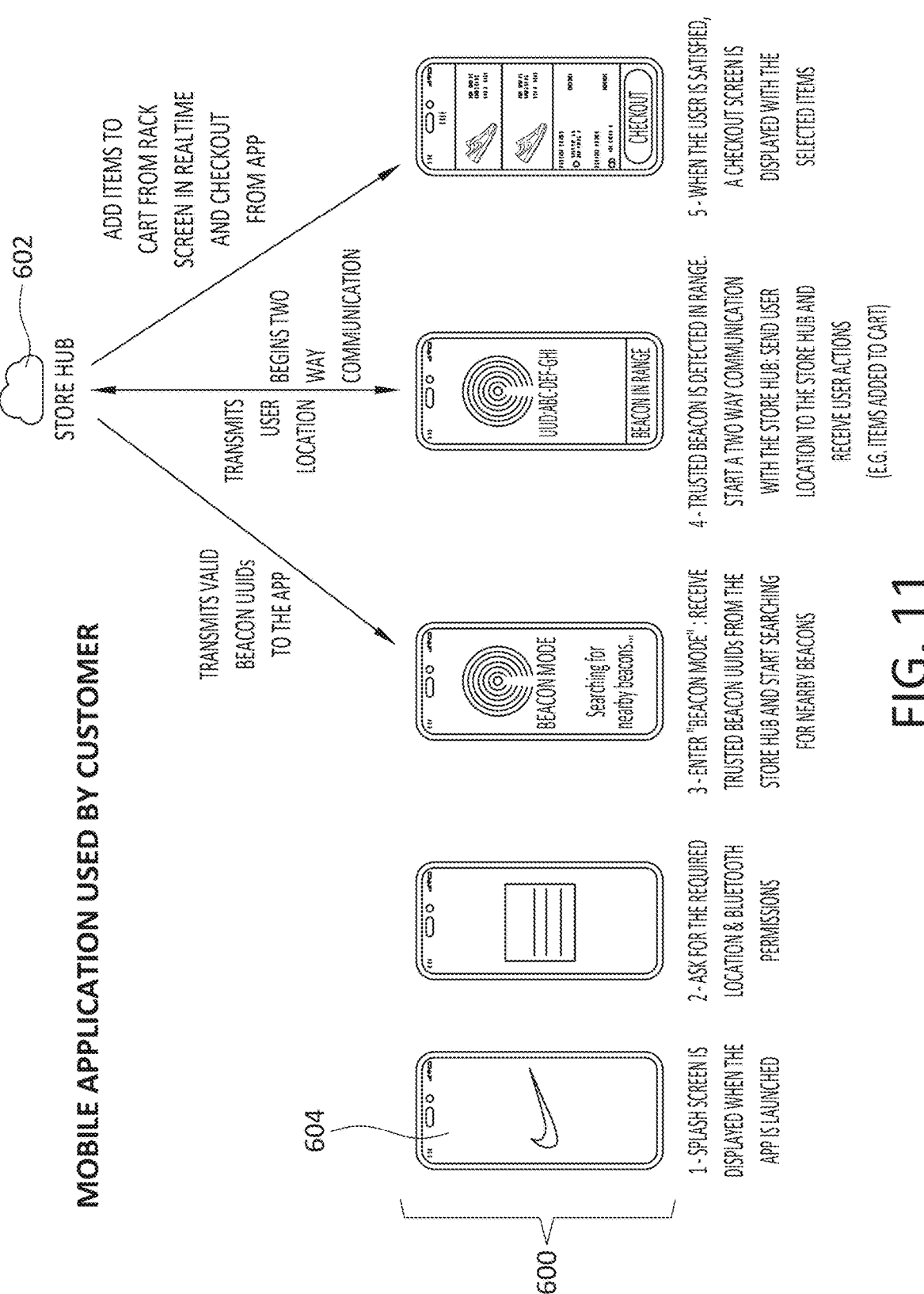

MOBILE APPLICATION USED BY CUSTOMER

STORE HUB 602

ADD ITEMS TO CART FROM RACK SCREEN IN REALTIME AND CHECKOUT FROM APP

TRANSMITS USER LOCATION

BEGINS TWO WAY COMMUNICATION

TRANSMITS VALID BEACON UUIDs TO THE APP

5 - WHEN THE USER IS SATISFIED, A CHECKOUT SCREEN IS DISPLAYED WITH THE SELECTED ITEMS

4 - TRUSTED BEACON IS DETECTED IN RANGE. START A TWO WAY COMMUNICATION WITH THE STORE HUB: SEND USER LOCATION TO THE STORE HUB AND RECEIVE USER ACTIONS (E.G. ITEMS ADDED TO CART)

BEACON MODE
Searching for nearby beacons...

UUID:ABC-DEF-GHI
BEACON IN RANGE

3 - ENTER "BEACON MODE": RECEIVE TRUSTED BEACON UUIDs FROM THE STORE HUB AND START SEARCHING FOR NEARBY BEACONS

2 - ASK FOR THE REQUIRED LOCATION & BLUETOOTH PERMISSIONS

1 - SPLASH SCREEN IS DISPLAYED WHEN THE APP IS LAUNCHED

604

600

CHECKOUT

FIG. 11

SYSTEM CONTROL IDENTIFICATION WITH GAZE TRACKING

COPYRIGHT AND MASK WORK NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

TECHNOLOGICAL FIELD OF THE DISCLOSURE

Embodiments disclosed herein generally relate to use of human inputs as a basis for generating customized virtual experiences for a user. More particularly, at least some embodiments relate to systems, hardware, software, computer-readable media, and methods for, using human gesture inputs to control the operation of a computing system.

BACKGROUND

The retail industry is undergoing a profound transformation driven by rapidly changing consumer preferences, technological advancements, and increasing competition. To remain relevant and competitive in this dynamic landscape, retail enterprises face the challenge of finding innovative ways to engage customers, reduce transactional friction, enhance their shopping experiences, build their brands, and drive business transformation.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, embodiments will be described and explained with additional specificity and detail through the use of the accompanying drawings.

FIG. 5 discloses an approach for Identifying a human and placing that human within a physical store, according to one embodiment.

FIG. 7 discloses an approach for converting ranging information into physical coordinates, according to one embodiment.

FIG. 10 discloses how an identified customer triggers a commercial transaction, according to one embodiment.

FIG. 11 discloses an example mobile application for facilitating a commercial transaction, according to one embodiment.

DETAILED DESCRIPTION OF SOME EXAMPLE EMBODIMENTS

Figure 1:
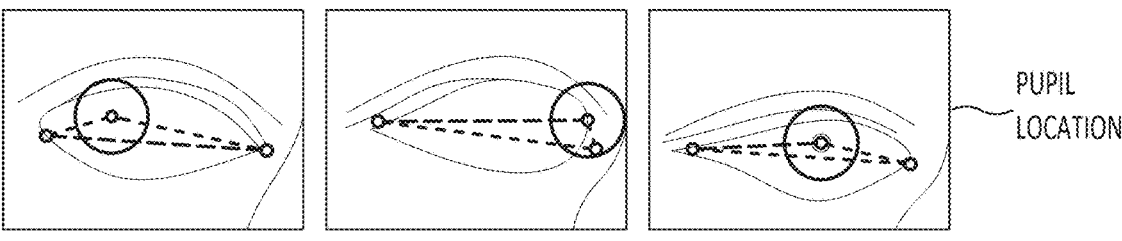
FIG. 1 discloses aspects of an example architecture and associated tracking procedures for one embodiment.

Embodiments disclosed herein generally relate to use of human inputs as a basis for generating customized virtual experiences for a user. More particularly, at least some embodiments relate to systems, hardware, software, computer-readable media, and methods for, using human gesture inputs to control the operation of a computing system.

One or more example embodiments comprise methods and architectures using human gestures as a mechanism for a human to control one or more computing systems and, in particular, to control aspects of a virtual environment with which that human can interact. One such method according to an embodiment may be implemented with a system and architecture that comprises one or more user-visible displays, a camera corresponding to one or more of the displays, and one or more computing systems connected with the cameras and displays. The method may comprise operations including, but not limited to: tracking a position of the pupil of a human eye of a user; comparing the relative location of the pupil within the eye; determining which display, of a group of displays, the eye of the user is directed to; and, enabling gesture-based control, by the user, of the display that the user is looking at.

Embodiments, such as the examples disclosed herein, may be beneficial in a variety of respects. For example, and as will be apparent from the present disclosure, one or more embodiments may provide one or more advantageous and unexpected effects, in any combination, some examples of which are set forth below. It should be noted that such effects are neither intended, nor should be construed, to limit the scope of the claims in any way. It should further be noted that nothing herein should be construed as constituting an essential or indispensable element of any embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment is that a user may be automatically handed control of a display that the user is looking at. In an embodiment, control of a display that the user is no longer looking at may be disabled. In an embodiment, a system and method may determine which display, of a group of displays, a user is looking at. Various other advantages of one or more example embodiments will be apparent from this disclosure.

A. Context for One or More Embodiments for One Embodiment

The following is a discussion of aspects of a context for various embodiments. This discussion is not intended to limit the scope of the claims or this disclosure, or the applicability of the embodiments, in any way.

A.1 Introduction

The retail industry is undergoing a profound transformation driven by rapidly changing consumer preferences, technological advancements, and increasing competition. To remain relevant and competitive in this dynamic landscape, retail enterprises face the challenge of finding innovative ways to engage customers, reduce transactional friction, enhance their shopping experiences, build their brands, and drive business transformation.

This disclosure encompasses a variety of areas. These include, but are not necessarily limited to: product visualization, virtual try-on, store optimization, consumer privacy, and interactive kiosks. By leveraging these technologies, retailers can cater to the increasing demands of tech-savvy consumers who seek convenient, immersive, and informative shopping encounters. As discussed in detail elsewhere herein, some particular embodiments concern the calibration of 2+ beacon and camera systems to obtain an exact, rather than relative, location of a user, and the utilization of dynamic calibration among the systems to reduce cost.

One or more embodiments may involve what are sometimes referred to as data network effects. For example, processes, infrastructure, and algorithms may be used to generate data network effects. A data network effect refers to the situation where the value of a system increases as more data accumulates within it. Realistic creation of data network effects may be attained by automatically capturing and processing contextualized. Data network effects are commonly leveraged in generative AI systems.

Generative AI requires large datasets that must be kept fresh through back-and-forth customer interactions, such as with a virtual assistant for example. To remain competitive, an AI operator must corral data, analyze it, offer predictions, and then seek feedback, such as from one or more users, to sharpen subsequent suggestions. The value of generative AI systems depends on the data that is automatically collected from users. The generative AI system performance—its ability to accurately predict and suggest—thus hinges on the economic principle referred to as data network effects.

Useful bits of data, such as may be generated and employed in a generative AI system, can be found everywhere. As an example, data may come from interactions with buyers, suppliers, and coworkers. A retailer, for example, could track what consumers looked at, what they placed in their cart, and what they ultimately paid for. These minute, seemingly trivial, details can vastly improve the predictions of a generative AI system. This data need not necessarily be sourced from humans pounding keyboards. Such data may, instead, be sensed and gathered using devices and sensors such as microphones, cameras, and other high-resolution sensors, and processed using "Distributed ML" or "Field AI" on tailored infrastructure.

A.2 Example Aspects of Various Embodiments

It is expected that immersive technology will become a key enabler of business transformation because it enables humans to interact with business information persisted in datastores, machinery represented as digital twins, and artificial intelligence easily and as equals. This idea may be referred to as the immersive enterprise. This disclosure defines an immersive enterprise as a business that leverages immersive technology to perform business transformation. This idea is aligned with what some in the industry define as spatial computing.

Within spatial or immersive environments, other ability to model and improve business processes is only constrained by the processing capabilities of the underlying infrastructure. Thus, an embodiment can leverage real-world physics, or not. An embodiment may make a simulated environment track real time operations or replay the past. Historical analysis, exploratory planning, and new product introduction all become easier. Having these capabilities available to the average business has never happened before. It has the potential to dramatically improve businesses and to reduce transactional friction.

One example embodiment, discussed elsewhere herein, is focused on the retail vertical. However, it is noted that the concepts disclosed herein are largely transferable or applicable to other verticals.

B. Detailed Discussion of Aspects of One or More Embodiments

B.1 Introduction

One or more embodiments are concerned with computing system control identification with gaze tracking, which may be used as an approach for optimizing the operation of a store that may involve use gesture-based touchless display. This disclosure is inspired by it. Some embodiments are particularly concerned with methods for identifying a controlled screen, that is, a screen controlled—or to be controlled—by user, through gaze tracking. In more detail, using different deployment methods and a calculation set up, one embodiment comprises a system to detect user eye movements and eye position, thus, to identify the screen, of a group of screens, that is being looked at by the user. The method of using gaze detection for screen control can be utilized in many other scenarios besides retail. As long as the environment has multiple screen and needs to decide which screen is being used, an embodiment may be employed.

By way of comparison with one or more embodiments, Amazon, Walmart, and others have performed research, developed intellectual property, and products in this space. Examples include: Amazon Just Walk Out, Amazon Smart Grocery Carts, Walmart Smart Check Out, and the Walmart Intelligent Retail Lab. However, while there may be some gross similarities between that work and one or more embodiments, one or more of such embodiment is differentiated on various bases such as, for example, the use in an embodiment of cellphone-based radio telemetry in combination with photonic camera data. In addition, the sensing, edge-based compute, and novel use of gesture-controlled display technology, creates differentiation between one or more embodiments, and conventional approaches.

B.2 Detailed Discussion

B.2.1 Overview

One or more embodiments may have various capabilities, although no embodiment is required to have any particular capability, or capabilities. For example, one or more embodiments enable the creation and use of a virtual 'endless aisle' by using stereoscopic cameras, smart shelves, AI models, procedural code, ultra-wide band radio beacons, smartphone applications, and computer displays. Some example capabilities of one or more embodiments include, but are not limited to:

1. [PROCESS, INFRA, ALGO FLOW] The ability to use gaze tracking algorithms to identify the screen being used, or viewed, by a user.
2. [PROCESS, INFRA, ALGO FLOW] The deployment of either single or multi cameras with multiple screens to capture user eye position and eye movement.

B.2.2 Architectures and Operations According to Some Example Embodiments

With reference now to FIGS. 1 through 4, details are provided concerning some example architectures and operations according to one or more embodiments. Such architectures and operations may involve the use of various cameras, displays or screens, and computing systems.

In circumstances where multiple display screens are present, an embodiment may be able to detect which screen is the one that the user is looking at, and use that information to activate the operations, which may be controlled by the user, on that particular display. Although there are many use cases, the following discussion assumes, solely for the purposes of illustration, a retail space with 2 screens.

With particular reference to the top view in FIG. 1, a system 100 may have 2 screens 102 and 104. Each screen 102 and 104 is connected to a respective computer 106/110 and a camera 108/112. Each of the computers 106 and 110 may host a respective instance of a gaze detection AI (artificial intelligence) model capable of determining user 114 eye position, and tracking user 114 eyeball movements. As shown in the top view of FIG. 1, both screens 102 and 104 may be visible to the user 114. When the user 114 comes within a predetermined distance of the screens 102 and 104, the camera 108 and 112 will track, or attempt to, the pupil position of the user 114 position, and compare the relative location of the pupil position within the eye of the user 114. This pupil tracking is shown in the middle view of FIG. 1, and the pupil locating is shown in the bottom view of FIG. 1.

Figure 2:
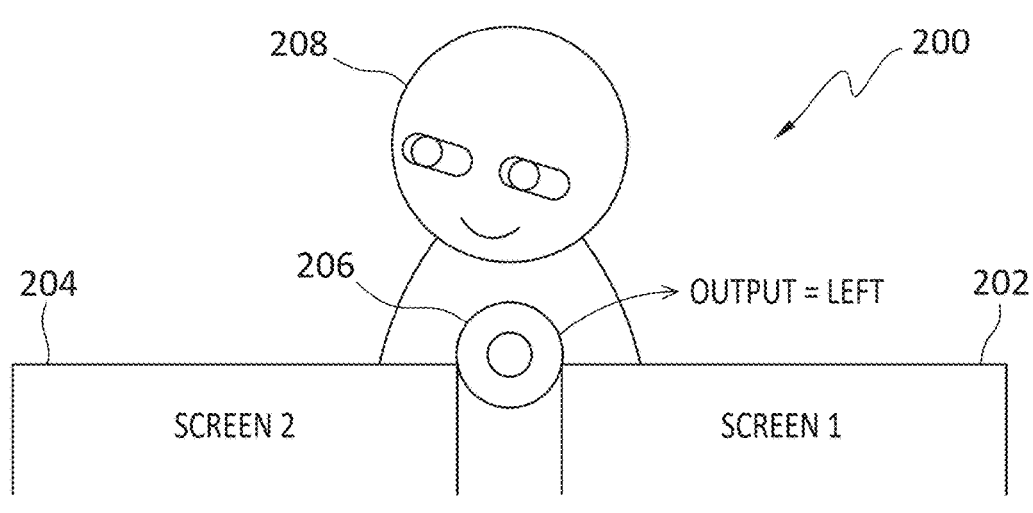
FIG. 2 discloses aspects of an example architecture according to an embodiments.
Figure 3:
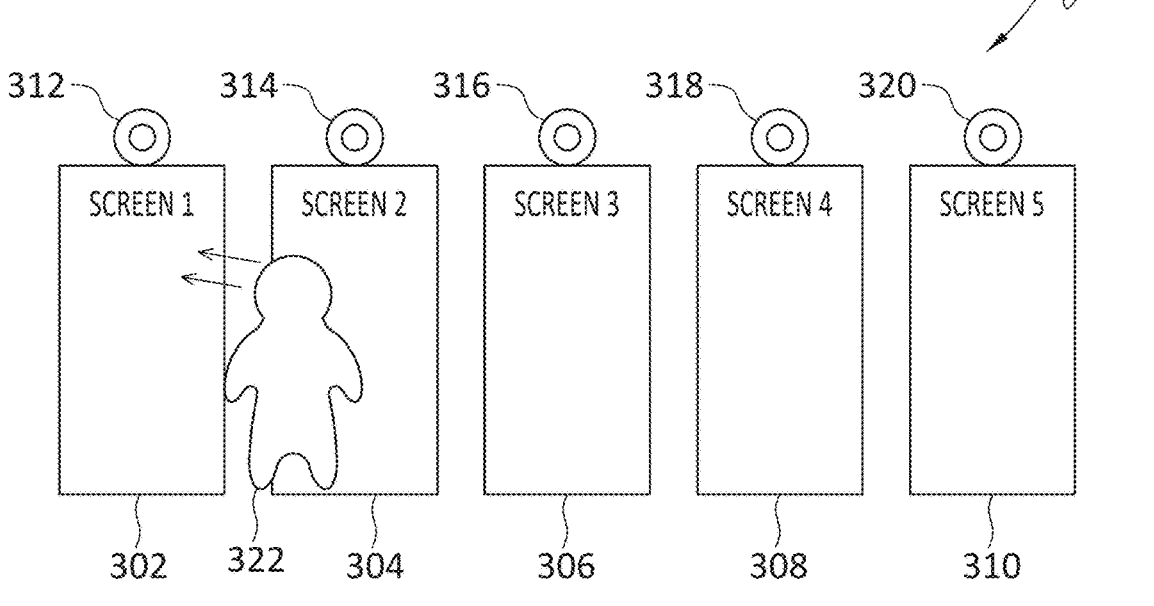
FIG. 3 discloses aspects of another example architecture according to an embodiments FIG. 4 discloses example camera views corresponding to the example architecture of FIG. 3.
Figure 4:
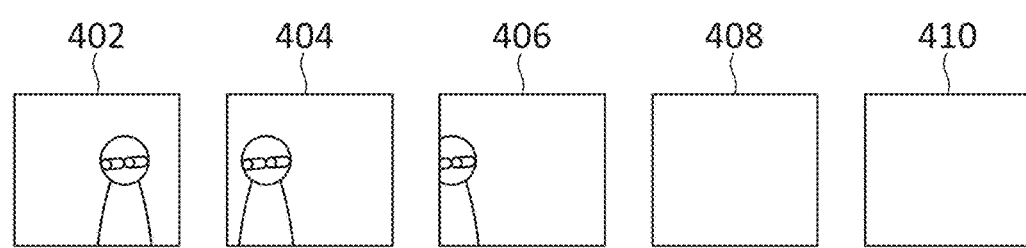

With reference now to the examples of FIGS. 2 through 4, there are variety of different architectures that may be employed in various embodiments. For example, an embodiment may comprise either a single camera, or multiple cameras. A single camera approach may be well suited where only one, or a few, screens are present. In the example architecture 200 of FIG. 2, there are only two screens 202 and 204, and a single camera 206. The two screens 202 and 204 are adjacent to each other in this example. In another single camera scenario, four screens may be present, with two screens on top, and two screens on the bottom.

As shown in the example of FIG. 2, and an embodiment may assume that the camera 206 is mounted between the screens 202 and 204, and the user 208 also stands in that center location. An output of an embodiment of a system, such as that disclosed in FIG. 1 or FIG. 2, is the direction in which the eyes of the user 208 are looking. In FIG. 2, the user 208 is looking at screen 202 (screen 2), so the output of the camera 202, which is facing the user 208, is "left," that is, from the perspective of the camera 202, the user 208 is looking to the left at screen 202. In the 4 screen example mentioned above, an example camera output might be a combination of 2 directions, such as "left down," to indicate which of the four screens is being looked at by a user. The example architecture 200 of FIG. 2 may be beneficial in that it only requires a single camera 206 and computer (not shown), so that equipment cost and computation cost are kept low. On the other hand, however, that architecture 200 may be limited in the sense that it only supports small number of screens.

With reference now to FIG. 3, an example architecture 300 is disclosed that differs from the architecture 200 both in terms of the number of displays, and the number of cameras, employed. Architectures such as the architecture 300 may be referred to herein as, or as implementing, a multi-camera approach. In the example of FIG. 3, the architecture 300 comprises 5 screen 302, 304, 306, 308, and 310. Each of the screens 302-310 is associated with a respective camera 312, 314, 316, 318, and 320. A single computer system (not shown) may be provided to operate with all the screens, or a respective computer system (not shown) may be provided for each camera/screen pair. In either case, a camera may or may not be mounted to its associated screen. The configuration in FIG. 3 may generate, as outputs, both the location of the user 322, and the direction of the gaze of the user 322.

For example, and with continuing reference to FIG. 3, there are 5 screens 302-310 with 5 cameras 312-320, and the user 322 stands in front of screen 304 (screen 2) but is looking towards screen 302 (screen 1). FIG. 4 discloses the 5 respective views 402, 404, 406, 408, and 410, respectively captured by the cameras 312-320. It is noted that for camera 318 (camera 4) and camera 320 (camera 5), they probably cannot capture the user 322 at all because the user 322 is standing too far away from them. Thus, in the example of FIGS. 3 and 4, the camera outputs, shown at 402 through 410, may be as follows:

camera1 (312), gaze=left, user location=right;
camera2 (314), gaze=left, user location=left;
camera3 (316), gaze=left, user location=left;
camera4 (318), gaze=null, user location=null;
camera5 (320), gaze=null, user location=null;

Using these camera outputs, a computer according to an embodiment may perform some basic calculations to generate the result, that the user 322 is standing in front of screen 2 and is looking at screen 1. While the approach exemplified in FIGS. 3 and 4 may be relatively accurate than an approach using fewer screens and/or cameras, the approach in FIGS. 3 and 4 may be relatively more expensive due to the larger number of screens and cameras employed.

With either one of the algorithms flows indicated in FIG. 2 or FIGS. 3/4, an embodiment may obtain a result indicating which screen the user is looking at. Then, an embodiment may activate the functionality with that screen. In the demo space example disclosed herein, an embodiment uses gesture control on the screens. So, once the system obtains the result, the system will enable the cursor movement on the screen that the user is looking at, and deactivate the cursor functionality in all other screens.

This approach may be employed in a general use case for screen control, such as in a case where a user works with 2 computers using mouse and keyboard. Once the system detects that the user is looking at screen 1, the system will establish the connection between the mouse-keyboard pair and computer 1, and cut off the connection to computer 2 at the same time. Embodiments may use various methods to cut off, and establish, a connection between the computer and the controlling devices, such as a mouse and keyboard for example. These connections may be established, and broken, using Bluetooth and Wi-Fi connections, for example.

C. Aspects of Some Example Use Cases

Embodiments may be employed in a variety of different applications. The following examples are provided only by way of illustration and are not intended to limit the scope of this disclosure, or of any claims, in any way.

C.1 Example 1—Developer Usage for Controlling Different Systems

One or more embodiments may be employed in a general use case for screen control. Often, engineers and developers need to work with different systems at the same time. For example, when a developer works with one laptop with Windows OS and one Jetson with Linux at the same time, and each device is connected to its individual screen. It is usually most convenient to have 2 mouse/keyboard pairs to work with the two devices, but still, the developer needs to switch between keyboards and mice. Using an embodiment, the developer can transit seamlessly between different systems, which may significantly boost productivity.

C.2 Example 2—Virtual Endless Aisle

As disclosed in the examples of FIGS. 5 through 10, an embodiment may comprise a method, such as the method 500, that may implement a so-called 'endless aisle' that may be accessed by a user. The endless aisle may be configured at least in part based on user-specific attributes and, in this way, an endless aisle may be built and implemented to suit a particular user.

As shown in FIG. 5, the method 500 may begin 502 with the identification of an object as a human, and determining a location of that human within a particular environment, such as a retail store for example. At 504, shown in FIG. 6, the human may be identified 504 as being a particular customer. In an embodiment, this identification may use an RF (radio frequency) rangefinding process, based on signals from a mobile device, such as a cell phone, of the user to identify the user. Details concerning an example rangefinding process are indicated in FIG. 6.

Figure 6:
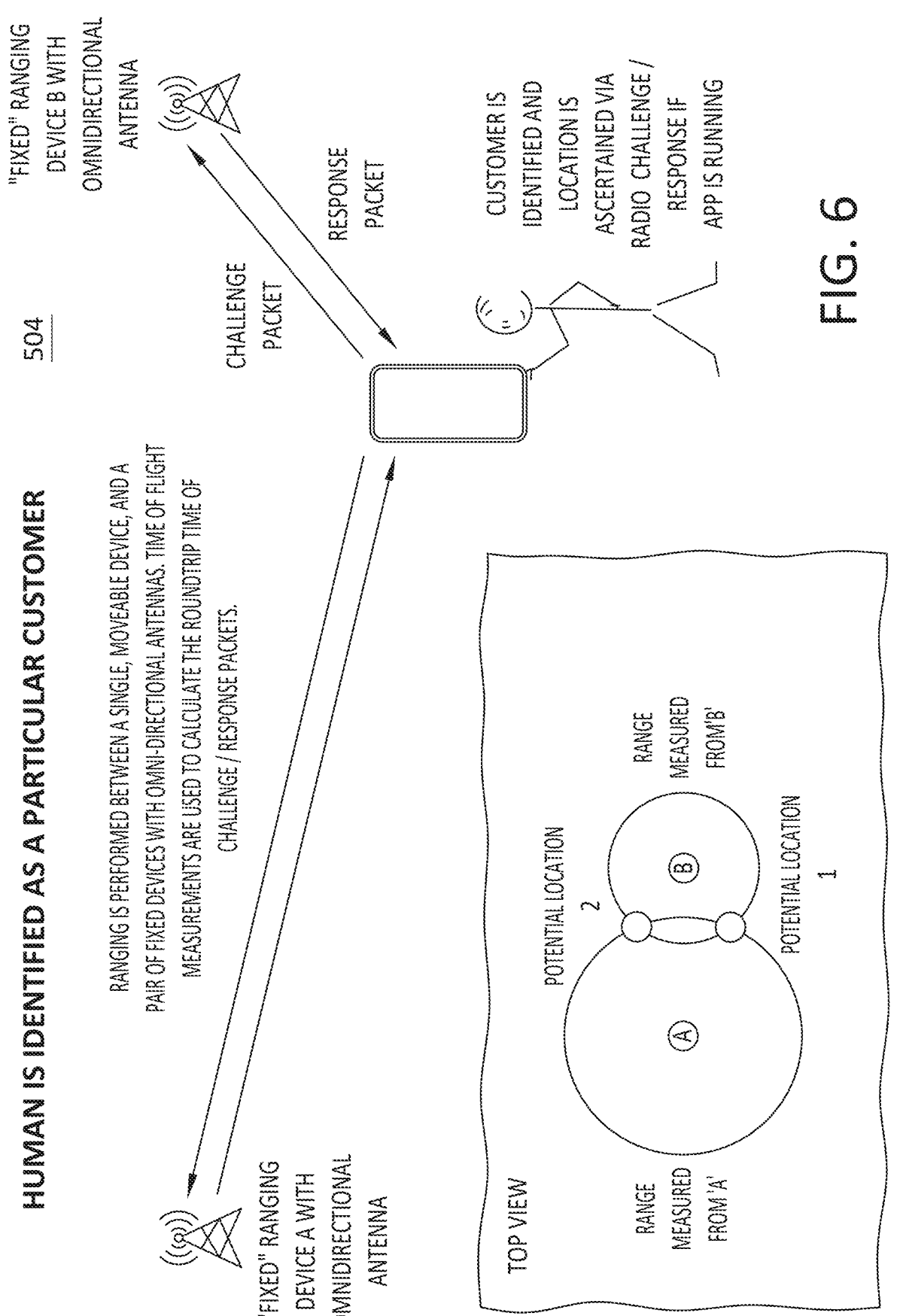
FIG. 6 discloses an approach for identifying a particular customer using RF range finding, according to one embodiment.

It is noted, that in the process shown in FIG. 6, a user may, but need not, be identified as being a specific person. With privacy concerns in view however, an embodiment may obtain information from the cell phone that is not personal identifying information (PII), so that the privacy of the user is preserved. Any other approach for uniquely identifying the customer, but without accessing or using PII, may be employed in an embodiment.

As shown in FIG. 7, a process 506 may be performed to determine the coordinates of the location of the user within a physical space, such as the retail store mentioned earlier. In an embodiment, determining 506 the location of the user may involve converting ranging information, possibly obtained with antennas as shown in FIG. 6, into physical coordinates of the user location in the physical space.

Figure 8:
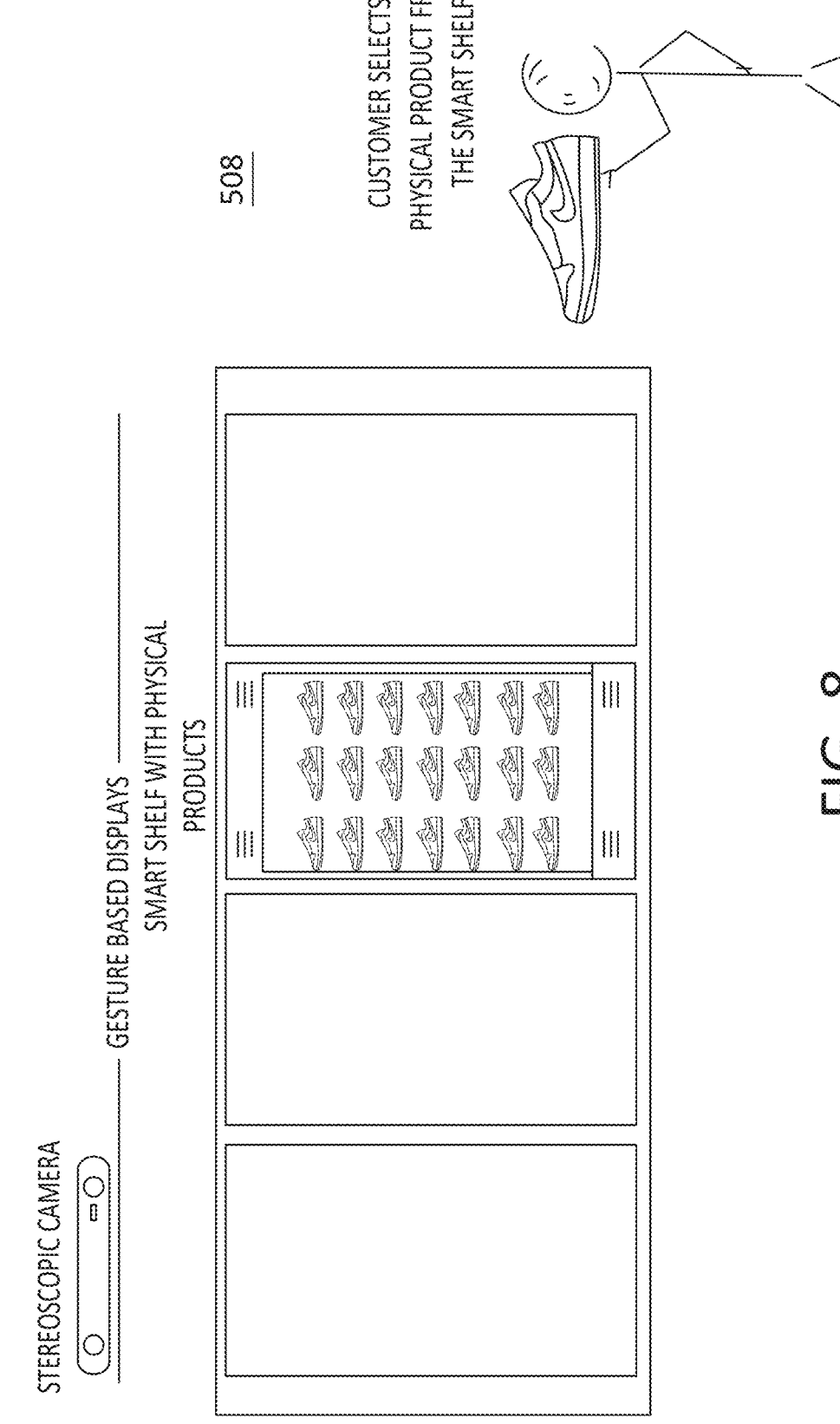
FIG. 8 discloses how an identified customer selects products of interest, according to one embodiment.

Within the physical space, as with reference now to FIG. 8, the user may select 508 one or more products from a smart shelf of an endless aisle. In particular, the physical space in which the user is located may include one or more screens and cameras, example arrangements of which are disclosed elsewhere herein. A camera may determine which of the screens the user is looking at, and may enable user control of that display. The user may then use a gesture, such as a hand movement for example, to select one or more products appearing on the display that the user is looking at.

Figure 9:
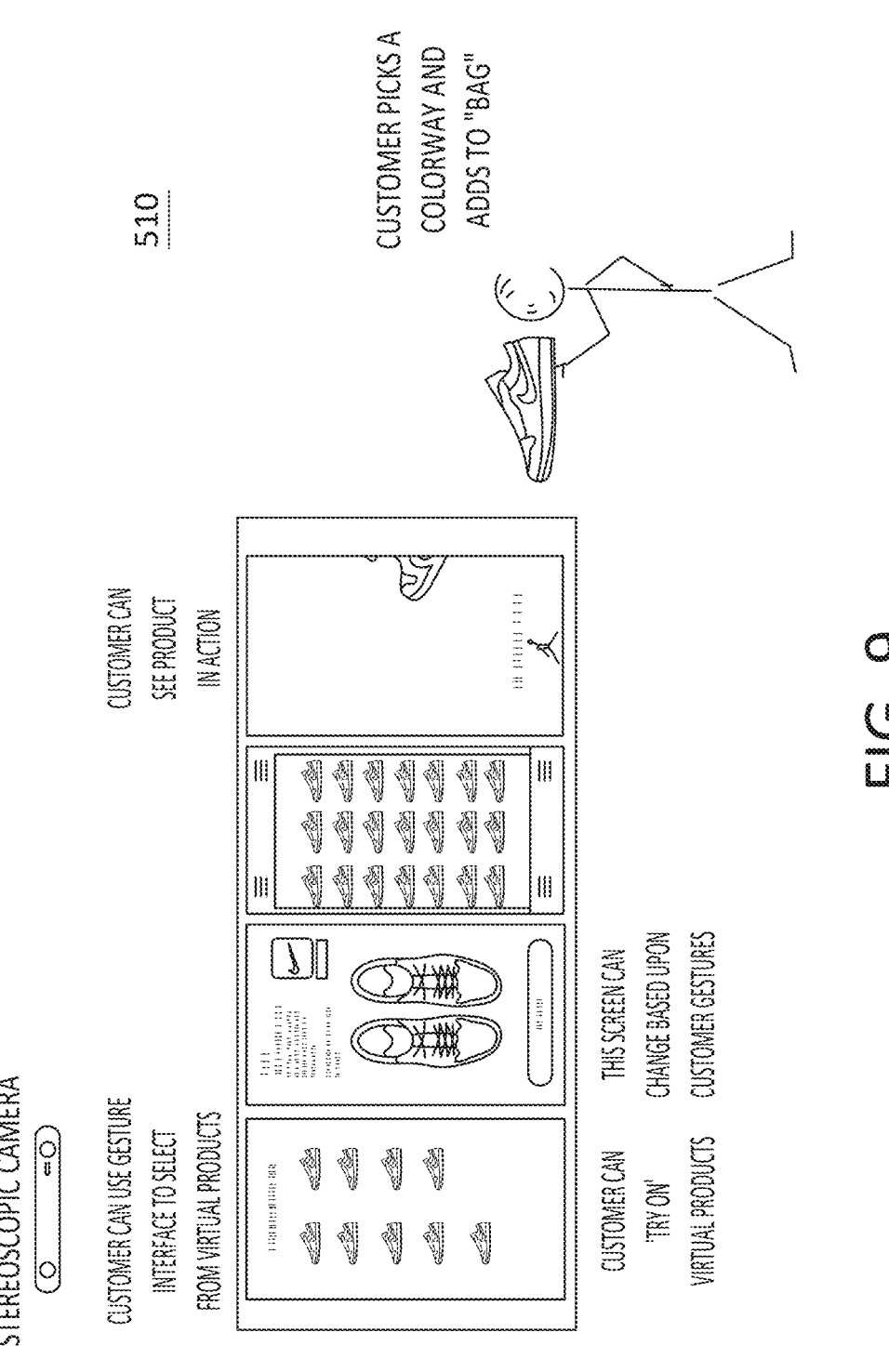
FIG. 9 discloses how an identified customer interacts with virtual merchandise, according to one embodiment.

As shown in FIG. 9, the user may then interact 510 with a selected product. For example a user can 'try on' a virtual product to check fit and appearance. As well, a user may be able to view a video showing the selected product in use. If the user decides to purchase a product, the user can then add the product, along with size and color information for example, to a virtual shopping bag. Finally, and as shown in FIG. 10, the user can purchase 512 the product(s) in the virtual shopping bag. The user may receive an order confirmation and shipping information.

All of the operations in FIGS. 8, 9, and 10, may be instantiated by a user simply through the use of hand, or other, gestures to control the operation of the display and the operation of an underlying computer system. The endless aisle concept disclosed herein may enable a user in a single particular location to access a wide array of products and services spanning all types of technologies and uses. It will thus be appreciated that the examples disclosed herein are presented simply for illustrative purposes, and not by way of limitation in any way.

C.3 Example 3—Virtual Endless Aisle with Mobile App

With reference now to FIG. 11, there is disclosed a method 600, according to one embodiment, for use of a mobile application to facilitate a commercial transaction involving a virtual endless aisle. As shown, the method 600 may be implemented in conjunction with a store hub 602 that communicates with a mobile app 604 on a mobile device of a user.

Figure 12:
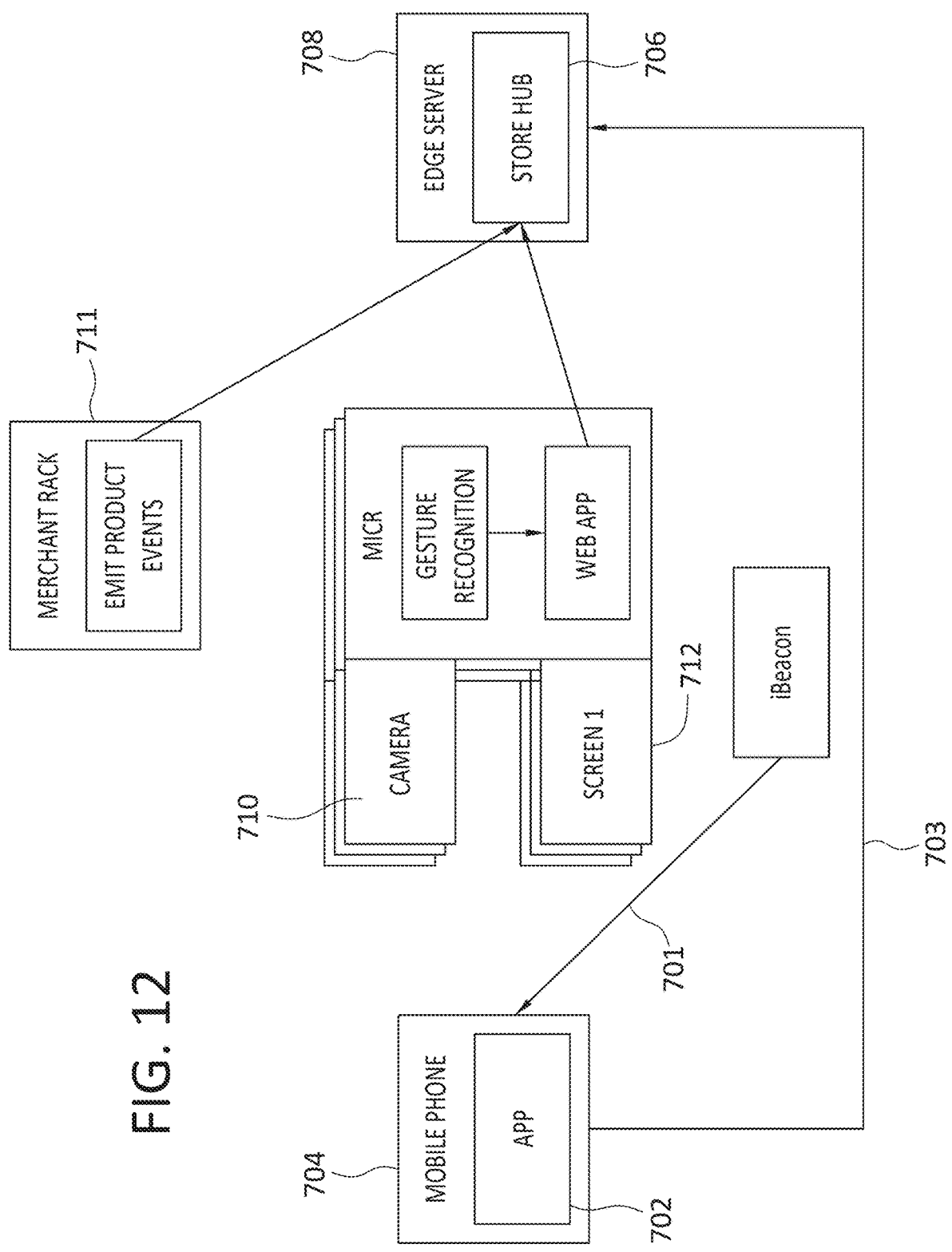
FIG. 12 discloses an example interaction between mobile, customer visible, and back end components, according to one embodiment.

With reference now to the example of FIG. 12, an example method 700 is disclosed that involves interaction between a mobile device, customer, and back end components. In the example method 700, a customer may open an app 702 on a mobile device 704 and may automatically receive an iBeacon 701 signal that is used by the mobile device 704 to connect 703 to a store hub 706 that may be hosted on an edge server 708. The customer may be observed by a camera 710 picking up a product such as a shoe, and the camera 710 may pass this information to the store hub 706. As well, the merchant rack 711 may receive this information from the camera 710 and emit a product event.

The store hub 706 may then gather all the latest information concerning the product, and may send that info to a set of screens 712. In this example embodiment, there may be three screens 712, namely, screen 1, screen 2, and screen 3. Here, screen 1 may display all of the same model designs, including stock availability information. Screen 2 may display detailed information about the shoe selected by the customer. And screen 3 may show a commercial video featuring the selected shoe.

The customer may then use a gesture, directed at screen 1 for example, to select a desired shoe design. The customer may then use a gesture to control screen 2, for example, to activate a 'try on' feature to see what the shoe would look like when worn. If the customer is satisfied, the customer may select, using a gesture directed to screen 3 for example, an 'add-to-cart' button to add the selected shoe to the customer shopping cart. Check out information may be shown on screen 3, and on the app 702. Finally, the customer may check out using the app 702.

D. Example Methods

It is noted that any operation(s) of any of the methods disclosed herein, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

E. Further Example Embodiments

Following are some further example embodiments. These are presented only by way of example and are not intended to limit the scope of this disclosure or the claims in any way.

Embodiment 1. A method for enabling user control of a display screen, comprising: tracking, by a camera, a position of a pupil of an eye of a human user who is positioned to be able to view multiple display screens; determining a location of the pupil within the eye; determining, as among the display screens, and based on the location of the pupil, which of the display screens is being looked at by the user; and enabling control, by the user, of the display screen that the user is looking at.

Embodiment 2. The method as recited in any preceding embodiment, wherein multiple cameras are used to determine the location of the pupil within the eye, and a determination is made as to (1) which of the display screens the user is nearest to, and (2) which additional ones, if any, of the display screens that the user is looking at.

Embodiment 3. The method as recited in any preceding embodiment, wherein the control of the display screen that is enabled is gesture-based control.

Embodiment 4. The method as recited in any preceding embodiment, wherein when the camera detects that the user has shifted to looking at another of the display screens, user control of the another display screen is automatically enabled, and user control of the display screen is automatically disabled.

Embodiment 5. The method as recited in any preceding embodiment, wherein, prior to the tracking, the user is identified as being a human and being located within a physical store.

Embodiment 6. The method as recited in any preceding embodiment, wherein, prior to the tracking, the user is identified, based on a signal received from a mobile device of the user, as being a particular user.

Embodiment 7. The method as recited in any preceding embodiment, wherein, prior to the tracking, coordinates of a location of the user in a physical store are determined.

Embodiment 8. The method as recited in any preceding embodiment, wherein a gesture-based input is received from the user, and the gesture-based input is used to trigger presentation, on the display screen that the user is looking at, of one or more particular products.

Embodiment 9. The method as recited in embodiment 8, wherein the one or more particular products that are presented on the display screen that the user is looking at are presented based on an identification of the user as being a particular user.

Embodiment 10. The method as recited in any preceding embodiment, wherein the user is able to control the display screen without the use of a physical device.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of this disclosure also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality. Combinations of the above should also be included within the scope of computer storage media. Such media are also examples of non-transitory storage media, and non-transitory storage media also embraces cloud-based storage systems and structures, although the scope of this disclosure is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments may be downloadable to one or more systems or devices, for example, from a website, mesh topology, or other source. As well, the scope of this disclosure embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, client, agent, service, engine, or the like may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments may be performed in client-server environments, whether network or local environments, or in any other suitable environment. Suitable operating environments for at least some embodiments include cloud computing environments where one or more of a client, server, or other machine may reside and operate in a cloud environment.

Figure 13:
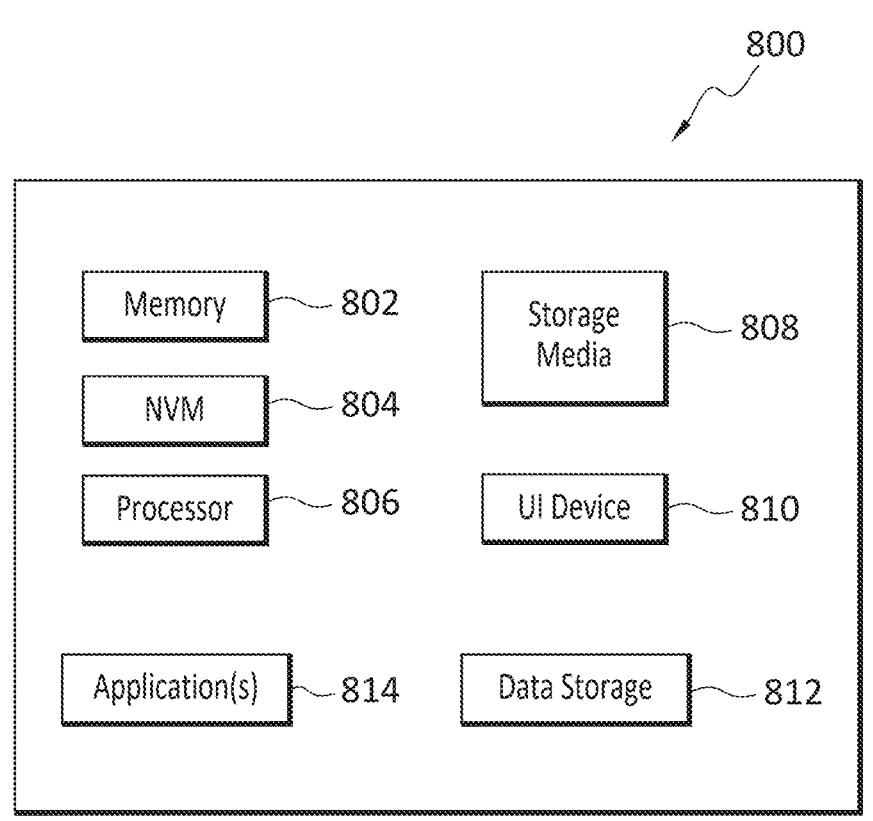
FIG. 13 discloses aspects of an example computing entity configured and operable to perform any of the disclosed methods, processes, and operations.

With reference briefly now to FIG. 13, any one or more of the entities disclosed, or implied, by FIGS. 1-12, and/or elsewhere herein, may take the form of, or include, or be implemented on, or hosted by, a physical computing device, one example of which is denoted at 800. As well, where any of the aforementioned elements comprise or consist of a virtual machine (VM), that VM may constitute a virtualization of any combination of the physical components disclosed in FIG. 13.

In the example of FIG. 13, the physical computing device 800 includes a memory 802 which may include one, some, or all, of random access memory (RAM), non-volatile memory (NVM) 804 such as NVRAM for example, read-only memory (ROM), and persistent memory, one or more hardware processors 806, non-transitory storage media 808, UI device 810, and data storage 812. One or more of the memory components 802 of the physical computing device 800 may take the form of solid state device (SSD) storage. As well, one or more applications 814 may be provided that comprise instructions executable by one or more hardware processors 806 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The described embodiments are to be considered in all respects only as illustrative and not restrictive. All changes which come within the meaning and range of equivalency of the claims are to be embraced within their scope.

What is claimed is:

1. A method for enabling user control of a display screen, comprising:

tracking, by a camera, a position of a pupil of an eye of a user who is positioned to be able to view multiple display screens;

using multiple cameras to determine a location of the pupil within the eye, wherein a determination is made as to (1) which of the display screens the user is nearest to, and (2) which additional ones, if any, of the display screens the user is looking at;

determining, as among the display screens, and based on the location of the pupil, which of the display screens is being looked at by the user; and enabling control, by the user, of the display screen that the user is looking at.

2. The method as recited in claim 1, wherein the control of the display screen that is enabled is gesture-based control.

3. The method as recited in claim 1, wherein when the camera detects that the user has shifted to looking at another of the display screens, user control of the another display screen is automatically enabled, and user control of the display screen is automatically disabled.

4. The method as recited in claim 1, wherein, prior to the tracking, the user is identified as being a human and being located within a physical store.

5. The method as recited in claim 1, wherein, prior to the tracking, the user is identified, based on a signal received from a mobile device of the user, as being a particular user.

6. The method as recited in claim 1, wherein, prior to the tracking, coordinates of a location of the user in a physical store are determined.

7. The method as recited in claim 1, wherein a gesture-based input is received from the user, and the gesture-based input is used to trigger presentation, on the display screen that the user is looking at, of one or more particular products.

8. The method as recited in claim 7, wherein the one or more particular products that are presented on the display screen that the user is looking at are presented based on an identification of the user as being a particular user.

9. The method as recited in claim 1, wherein the user is able to control the display screen without the use of a physical device.

10. A non-transitory storage medium having stored therein instructions that are executable by one or more hardware processors to perform operations comprising:

tracking, by a camera, a position of a pupil of an eye of a human user who is positioned to be able to view multiple display screens;

determining a location of the pupil within the eye;

determining, as among the display screens, and based on the location of the pupil, which of the display screens is being looked at by the user; and enabling control, by the user, of the display screen that the user is looking at so that upon receipt, from the user, of a gesture-based input, the gesture-based input is used to trigger presentation, on the display screen that the user is looking at, of one or more particular products.

11. The non-transitory storage medium as recited in claim 10, wherein multiple cameras are used to determine the location of the pupil within the eye, and a determination is made as to (1) which of the display screens the user is nearest to, and (2) which additional ones, if any, of the display screens that the user is looking at.

12. The non-transitory storage medium as recited in claim 10, wherein the control of the display screen that is enabled is gesture-based control.

13. The non-transitory storage medium as recited in claim 10, wherein when the camera detects that the user has shifted to looking at another of the display screens, user control of the another display screen is automatically enabled, and user control of the display screen is automatically disabled.

14. The non-transitory storage medium as recited in claim 10, wherein, prior to the tracking, the user is identified as being a human and being located within a physical store.

15. The non-transitory storage medium as recited in claim 10, wherein, prior to the tracking, the user is identified, based on a signal received from a mobile device of the user, as being a particular user.

16. The non-transitory storage medium as recited in claim 10, wherein, prior to the tracking, coordinates of a location of the user in a physical store are determined.

17. The non-transitory storage medium as recited in claim 10, wherein the one or more particular products that are presented on the display screen that the user is looking at are presented based on an identification of the user as being a particular user.

18. The non-transitory storage medium as recited in claim 10, wherein the user is able to control the display screen without the use of a physical device.

19. A non-transitory storage medium having stored therein instructions that are executable by one or more hardware processors to perform operations comprising:

tracking, by a camera, a position of a pupil of an eye of a user who is positioned to be able to view multiple display screens;

using multiple cameras to determine a location of the pupil within the eye, wherein a determination is made as to (1) which of the display screens the user is nearest to, and (2) which additional ones, if any, of the display screens the user is looking at;

determining, as among the display screens, and based on the location of the pupil, which of the display screens is being looked at by the user; and enabling control, by the user, of the display screen that the user is looking at.

\*　\*　\*　\*　\*